US012793635B2

(12) United States Patent
Park et al.

(10) Patent No.: US 12,793,635 B2
(45) Date of Patent: Nov. 10, 2026

(54) PIXEL DRIVING CIRCUIT, DISPLAY APPARATUS AND DRIVING METHOD

(71) Applicants: Chengdu BOE Optoelectronics Technology Co., Ltd., Chengdu (CN); BOE Technology Group Co., Ltd., Beijing (CN)

(72) Inventors: Changbum Park, Beijing (CN); Yongliang Zhao, Beijing (CN)

(73) Assignees: Chengdu BOE Optoelectronics Technology Co., Ltd., Chengdu (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/992,946

(22) PCT Filed: May 16, 2024

(86) PCT No.: PCT/CN2024/093732
§ 371 (c)(1),
(2) Date: Jan. 9, 2025

(87) PCT Pub. No.: WO2025/001612
PCT Pub. Date: Jan. 2, 2025

(65) Prior Publication Data
US 2026/0128008 A1 May 7, 2026

(30) Foreign Application Priority Data
Jun. 29, 2023 (CN) ......................... 202310789132.6

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2310/08* (2013.01)

(58) Field of Classification Search
CPC .. G09G 3/3233; G09G 3/3266; G09G 3/3225; G09G 3/3258; G09G 3/32;
(Continued)

(56) References Cited

U.S. PATENT DOCUMENTS

2015/0145902 A1 5/2015 Nakayama et al.
2017/0249900 A1* 8/2017 Xiang .................. G09G 3/3291
(Continued)

FOREIGN PATENT DOCUMENTS

CN 106531076 A 3/2017
CN 107358917 B 4/2020
(Continued)

OTHER PUBLICATIONS

CN202310789132.6 first office action issued on Sep. 30, 2025.

*Primary Examiner* — Dong Hui Liang
(74) *Attorney, Agent, or Firm* — IPro, PLLC

(57) ABSTRACT

A pixel driving circuit, a display device, and a driving method. The pixel driving circuit includes: a driving transistor (DT), provided with a gate coupled to a first node (N1), a first electrode coupled to a second node (N2), and a second electrode coupled to a third node (N3), and configured to generate a drive current based on a data voltage; a first reset control sub-circuit (10), coupled to the second node (N2) and a fourth node (N4), and configured to reset levels of the second node (N2) and the fourth node (N4); a data writing sub-circuit (20), coupled to the second node (N2), and configured to input the data voltage at a data signal terminal (Data) in response to a signal at the first scanning
(Continued)

signal terminal (Gate_P(n)) into the first node (N1); and a light-emitting control sub-circuit (30).

20 Claims, 8 Drawing Sheets

(58) Field of Classification Search
CPC .. G09G 3/3291; G09G 3/3208; G09G 3/3275; G09G 3/30; G09G 3/20; G09G 2300/0819; G09G 2300/0861; G09G 2300/0842; G09G 2300/0426; G09G 2300/0852; G09G 2300/0814; G09G 2300/0809; G09G 2300/043; G09G 2320/0233; G09G 2320/045; G09G 2320/0247; G09G 2320/043; G09G 2320/0238; G09G 2310/08; G09G 2310/0251; G09G 2310/0262; G09G 2310/061; G09G 2330/021; G09G 2340/0435
See application file for complete search history.

(56) References Cited

U.S. PATENT DOCUMENTS

| | | | | |
|---|---|---|---|---|
| 2021/0233468 | A1 | 7/2021 | Toyomura | |
| 2023/0290310 | A1* | 9/2023 | Wang | G09G 3/3233 |

FOREIGN PATENT DOCUMENTS

| | | | | | |
|---|---|---|---|---|---|
| CN | 112102785 | A | | 12/2020 | |
| CN | 113851083 | A | | 12/2021 | |
| CN | 114258320 | A | | 3/2022 | |
| CN | 114550653 | A | | 5/2022 | |
| CN | 115691426 | A | | 2/2023 | |
| CN | 116072044 | A | * | 5/2023 | G09G 3/20 |
| CN | 116778863 | A | | 9/2023 | |

* cited by examiner

PIXEL DRIVING CIRCUIT, DISPLAY APPARATUS AND DRIVING METHOD

CROSS-REFERENCES TO RELATED APPLICATIONS

The present disclosure is a National Stage of International Application No. PCT/CN2024/093732, filed on May 16, 2024, which claims priority to Chinese patent application No. 202310789132.6, filed on Jun. 29, 2023 to China National Intellectual Property Administration, the entire contents of which are incorporated herein by reference.

TECHNICAL FIELD

The present disclosure relates to the field of display technology and provides a pixel driving circuit, a display device, and a driving method.

BACKGROUND

In order to enable the display device to display images properly, it is necessary to configure the relevant pixel driving circuit for each pixel unit, i.e., the driving transistor drives the light-emitting device to emit light. In order to make the light-emitting device have a better display better between different frames, it is necessary to reset the electrodes of the driving transistor after the display of one frame of image is finished, so that the display of the next frame of image is not affected by the previous frame of image.

SUMMARY

Embodiments of the present disclosure provide a pixel driving circuit, a display device, and a driving method for simplifying a reset process of a driving transistor and enhancing a display effect of a picture.

The specific technical solutions provided in the present disclosure are as follows.

In a first aspect, embodiments of the present disclosure provide a pixel driving circuit including: a driving transistor, a light-emitting device, a first reset control sub-circuit, a data writing sub-circuit, and a light-emitting control sub-circuit; where a gate of the driving transistor is coupled to a first node, a first electrode of the driving transistor is coupled to a second node, and a second electrode of the driving transistor is coupled to a third node, and the driving transistor is configured to, based on a data voltage, generate a drive current; the first reset control sub-circuit is coupled to the second node and a fourth node, and is configured to reset a level of the second node and a level of the fourth node; the data writing sub-circuit is coupled to the second node, and is configured to, in response to a signal at a first scanning signal terminal, input the data voltage at a data signal terminal into the first node; and the light-emitting control sub-circuit is coupled to the light-emitting device through the driving transistor, and the light-emitting control sub-circuit is configured to provide the drive current generated by the driving transistor to the light-emitting device.

Optionally, the first reset control sub-circuit includes: a first switching transistor and a second switching transistor, where a polarity of the first switching transistor is different from a polarity of the second switching transistor; where a control terminal of the first switching transistor is coupled to a second scanning signal terminal, a first terminal of the first switching transistor is coupled to the fourth node, and a second terminal of the first switching transistor is coupled to the second node; and a control terminal of the second switching transistor is coupled to an enable signal terminal, a first terminal of the second switching transistor is coupled to a second initialization signal terminal, and a second terminal of the second switching transistor is coupled to the fourth node.

Optionally, the first reset control sub-circuit includes: a first switching transistor and a second switching transistor, where a polarity of the first switching transistor is the same as a polarity of the second switching transistor; where a control terminal of the first switching transistor is coupled to a fourth scanning signal terminal, a first terminal of the first switching transistor is coupled to the fourth node, and a second terminal of the first switching transistor is coupled to the second node; and a control terminal of the second switching transistor is coupled to a third scanning signal terminal, a first terminal of the second switching transistor is coupled to a second initialization signal terminal, and a second terminal of the second switching transistor is coupled to the fourth node.

Optionally, the first reset control sub-circuit includes: a first switching transistor, a second switching transistor, and a third switching transistor, where a polarity of the first switching transistor is different from a polarity of the second switching transistor, and a polarity of the third switching transistor is the same as the polarity of the second switching transistor; where a control terminal of the first switching transistor is coupled to a second scanning signal terminal, a first terminal of the first switching transistor is coupled to the third switching transistor, and a second terminal of the first switching transistor is coupled to the second node; a control terminal of the second switching transistor is coupled to an enable signal terminal, a first terminal of the second switching transistor is coupled to the second initialization signal terminal, and a second terminal of the second switching transistor is coupled to the fourth node; and a control terminal of the third switching transistor is coupled to a fourth scanning signal terminal, a first terminal of the third switching transistor is coupled to the first terminal of the first switching transistor, and a second terminal of the third switching transistor is coupled to the fourth node.

Optionally, the pixel driving circuit further includes: a second reset control sub-circuit; where the second reset control sub-circuit is coupled to the first node and the third node, and is configured to reset a level of the first node and a level of the third node.

Optionally, he second reset control sub-circuit includes: a fourth switching transistor and a fifth switching transistor, where a polarity of the fourth switching transistor is different from a polarity of the fifth switching transistor; where a control terminal of the fourth switching transistor is coupled to a second scanning signal terminal, a first terminal of the fourth switching transistor is coupled to a first initialization signal terminal, and a second terminal of the fourth switching transistor is coupled to a first terminal of the fifth switching transistor; and a control terminal of the fifth switching transistor is coupled to a third scanning signal terminal, and a second terminal of the fifth switching transistor is coupled to the first node.

Optionally, the second reset control sub-circuit includes: a fifth switching transistor; where a control terminal of the fifth switching transistor is coupled to a third scanning signal terminal, a first terminal of the fifth switching transistor is coupled to the third node, and a second terminal of the fifth switching transistor is coupled to the first node.

Optionally, the data writing sub-circuit includes: a sixth switching transistor; where a control terminal of the sixth switching transistor is coupled to the first scanning signal terminal, a first terminal of the sixth switching transistor is coupled to the data signal terminal, and a second terminal of the sixth switching transistor is coupled to the second node.

Optionally, the light-emitting control sub-circuit includes: a seventh switching transistor; where a control terminal of the seventh switching transistor is coupled to an enable signal terminal, a first terminal of the seventh switching transistor is coupled to the fourth node, and a second terminal of the seventh switching transistor is coupled to the third node.

Optionally, the pixel driving circuit further includes: an eighth switching transistor; where a control terminal of the eighth switching transistor is coupled to an enable signal terminal, a first terminal of the eighth switching transistor is coupled to the second node, and a second terminal of the eighth switching transistor is coupled to a first power supply terminal.

Optionally, the pixel driving circuit further includes: a first capacitor; where a first terminal of the first capacitor is coupled to the first node, and a second terminal of the first capacitor is coupled to a first power supply terminal.

Optionally, the light-emitting control sub-circuit includes: a seventh switching transistor; where the seventh switching transistor is a double-gate transistor, a first gate of the seventh switching transistor is coupled to a second scanning signal terminal, and a second gate of the seventh switching transistor is coupled to an enable signal terminal.

In a second aspect, embodiments of the present disclosure further provide a display device, including the above-described pixel driving circuit.

In a third aspect, embodiments of the present disclosure further provide a driving method of the pixel driving circuit, including: resetting, by the first reset control sub-circuit, the level of the second node coupled to the driving transistor; inputting, by the data writing sub-circuit, the data voltage at the data signal terminal into the first node coupled to the driving transistor in response to the signal at the first scanning signal terminal; generating, by the driving transistor, the drive current based on the data voltage; and providing, by the light-emitting control sub-circuit, the drive current generated by the driving transistor to the light-emitting device.

The beneficial effects of the present disclosure are as follows.

In summary, in the embodiments of the present disclosure, the pixel driving circuit, the display device, and the driving method are provided. The pixel driving circuit includes: the driving transistor, the light-emitting device, the first reset control sub-circuit, the data writing sub-circuit, and the light-emitting control sub-circuit. The gate of the driving transistor is coupled to the first node, the first electrode of the driving transistor is coupled to the second node, and the second electrode of the driving transistor is coupled to the third node, and the driving transistor is configured to, based on the data voltage, generate the drive current; the first reset control sub-circuit is coupled to the second node and the fourth node, and is configured to reset the level of the second node and the level of the fourth node; the data writing sub-circuit is coupled to the second node, and is configured to, in response to the signal at the first scanning signal terminal, input the data voltage at the data signal terminal into the first node; and the light-emitting control sub-circuit is coupled to the light-emitting device through the driving transistor, and the light-emitting control sub-circuit is configured to provide the drive current generated by the driving transistor to the light-emitting device. The reset of the second node can be realized without additionally setting up a reset port in the above-described solution, thereby simplifying the reset process of the driving transistor.

Other features and advantages of the present disclosure will be set forth in the subsequent specification and, in part, will become apparent from the specification or will be understood by implementing the present disclosure. The objects and other advantages of the present disclosure may be accomplished and obtained by the structure particularly noted in the specification as written, the claims, and the accompanying drawings.

BRIEF DESCRIPTION OF FIGURES

The accompanying drawings illustrated herein are used to provide a further understanding of the present disclosure and form a part of the present disclosure, and the schematic embodiments of the present disclosure and their illustrations are used to explain the present disclosure and do not constitute an undue limitation of the present disclosure. The accompanying drawings are illustrated as below.

DETAILED DESCRIPTION

In order to make the objects, technical solutions and advantages of the embodiments of the present disclosure clearer, the technical solutions of the present disclosure will be described clearly and completely in the following in conjunction with the accompanying drawings in the embodiments of the present disclosure, and it is clear that the described embodiments are a part of the embodiments of the technical solutions of the present disclosure and not all of the embodiments. Based on the embodiments recorded in the present disclosure, all other embodiments obtained by a person of ordinary skill in the art without making creative labor fall within the claimed scope of the technical solution of the present disclosure.

The terms “first”, “second”, etc. in the specification and claims of the present disclosure and the above-described accompanying drawings are used to distinguish between similar objects, and need not be used to describe a particular order or sequence. It should be understood that the data so used may be interchanged, where appropriate, so that the embodiments of the present disclosure described herein can be implemented using an order other than those illustrated or described herein.

Figure 1:
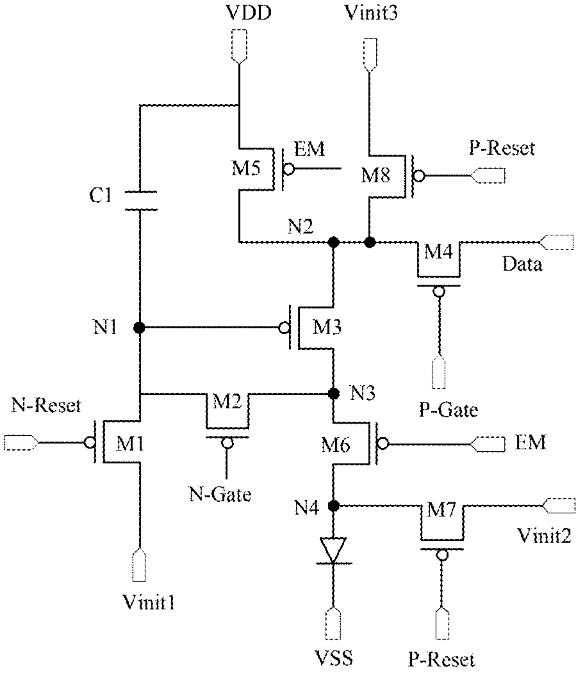
FIG. 1 is a schematic diagram of a pixel driving circuit in the related art.
Figure 2:
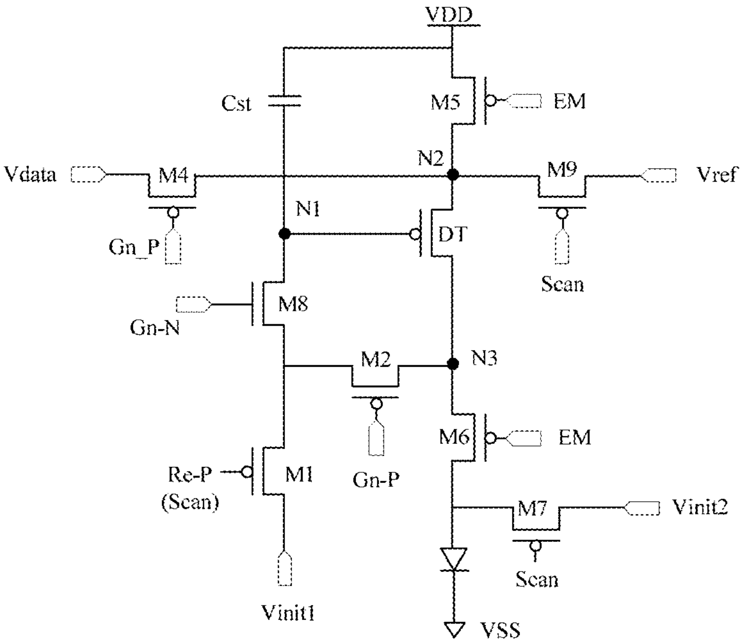
FIG. 2 is a schematic diagram of another pixel driving circuit in the related art.

In the related art, the N2 node of the driving transistor in the pixel driving circuit is often reset by connecting a new reset port externally. As shown in FIG. 1, the reset of the N2 node of the driving transistor requires the addition of a new transistor M8, which is added with a new connected external reset port Vinit3. Alternatively, as shown in FIG. 2, the reset of the N2 node of the driving transistor requires the addition of a new connected external transistor M9, which is added with a new connected external reset port Vref. In summary, the current wiring and external interface for the reset of the N2 node of the driving transistor is complicated.

The preferred embodiments of the present disclosure are described in detail below in connection with the accompanying drawings.

Figure 3:
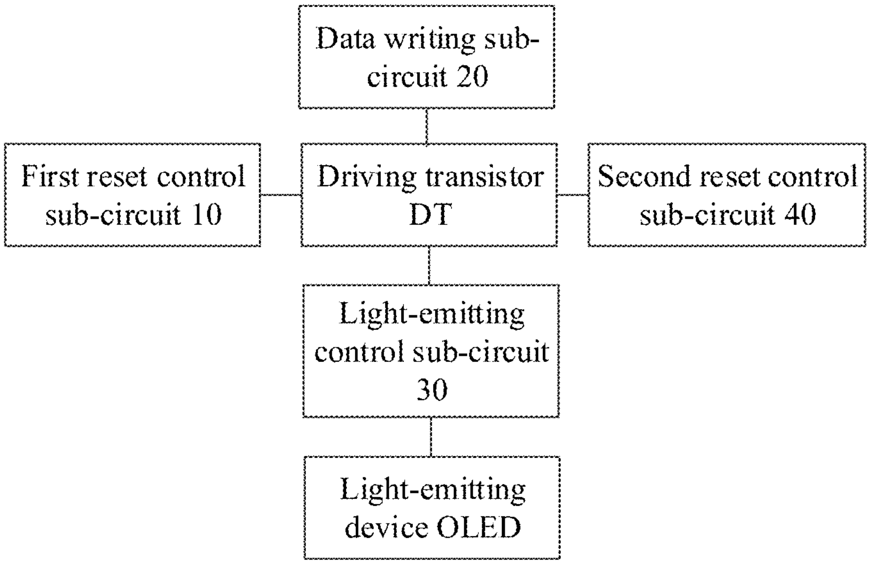
FIG. 3 is a schematic diagram of a connection in a pixel driving circuit in embodiments of the present disclosure.

Referring to FIG. 3, a pixel driving circuit proposed in embodiments of the present disclosure includes: a driving transistor DT, a light-emitting device OLED, a first reset control sub-circuit 10, a data writing sub-circuit 20, and a light-emitting control sub-circuit 30.

It should be noted that the pixel driving circuit proposed in the embodiments of the present disclosure generally drives an organic light-emitting diode (OLED), i.e., the above-mentioned light-emitting device is usually an OLED. In some application scenarios, the light-emitting device may be a quantum dot light-emitting diode (QLED), a micro light-emitting diode (Micro LED), a mini light-emitting diode (Mini LED), and other light-emitting devices that have the advantages of self-illumination and low energy consumption.

Figure 4:
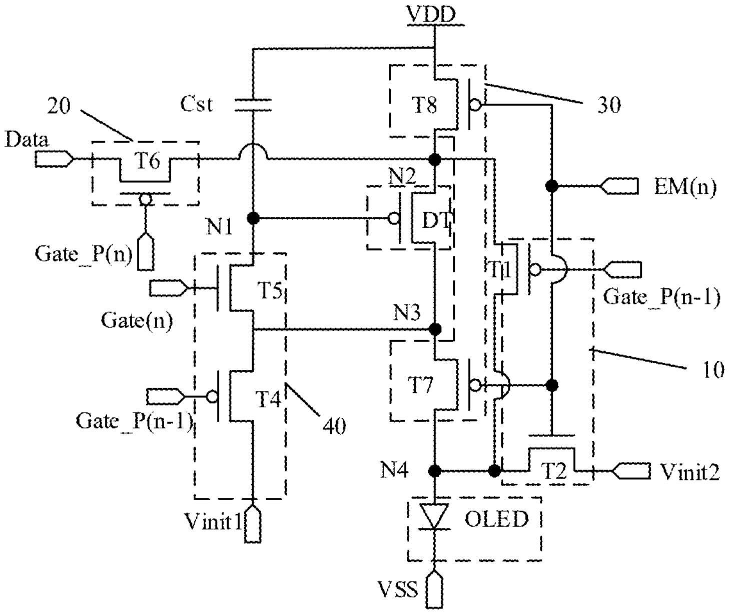
FIG. 4 is a circuit diagram of a first pixel driving circuit in embodiments of the present disclosure.

As shown in FIG. 4, a gate of the above-described driving transistor DT is coupled to a first node N1, a first electrode of the driving transistor DT is coupled to a second node N2, and a second electrode of the driving transistor DT is coupled to a third node N3, and the driving transistor is configured to generate a drive current based on a data voltage.

The above-described first reset control sub-circuit is coupled to the second node N2 and a fourth node N4, and is configured to reset a level of the second node N2 and a level of the fourth node N4.

The above-described data writing sub-circuit is coupled to the second node N2, and is configured to input the data voltage at a data signal terminal to the first node N1 in response to a signal at the first scanning signal terminal Gate_P(n).

The above-described light-emitting control sub-circuit is coupled to the light-emitting device OLED through the driving transistor DT, and the light-emitting control sub-circuit is configured to provide the drive current generated by the driving transistor DT to the light-emitting device OLED.

During the implementation, before the driving transistor DT carries out the display of a current frame of image, i.e., before the driving transistor DT generates the drive current that causes the light-emitting device OLED to emit light, it is necessary to reset the levels of the relevant nodes (in particular, the above-described second node N2) of the driving transistor DT. In the embodiments of the present disclosure, the levels of the second node N2 and the fourth node N4 are reset at the same time by means of the first reset control sub-circuit, after which the data writing sub-circuit inputs the data voltage at the data signal terminal into the first node N1 in response to the signal at the first scanning signal terminal Gate_P(n), so that the driving transistor DT can generate the drive current based on the data voltage, and then provide the drive current to the light-emitting device OLED under the control of the light-emitting control sub-circuit to realize light-emitting of the light-emitting device OLED.

As shown in FIG. 4, in an embodiment, the first reset control sub-circuit comprises: a first switching transistor T1 and a second switching transistor T2, where a polarity of the first switching transistor T1 is different from a polarity of the second switching transistor T2.

It should be noted that the polarity of the first switching transistor T1 is different from the polarity of the second switching transistor T2 in the embodiments of the present disclosure, and as shown in FIG. 4 with reference to FIG. 4, the first switching transistor T1 is a P-type transistor and the second switching transistor T2 is an N-type transistor.

The first switching transistor T1 is connected to the other devices in FIG. 4 in the following relationship. A control terminal of the first switching transistor T1 is coupled to a second scanning signal terminal Gate_P(n−1), a first terminal of the first switching transistor T1 is coupled to the fourth node N4, and a second terminal of the first switching transistor T1 is coupled to the second node N2.

During the implementation, when a signal at the second scanning signal terminal Gate_P(n−1) is at a low level, the first switching transistor T1 is turned on, and a level of the fourth node N4 coupled to the first switching transistor T1 and a level of the second node N2 coupled to the first switching transistor T1 are equal.

The second switching transistor T2 is connected to the other devices in FIG. 4 in the following relationship. A control terminal of the second switching transistor T2 is coupled to an enable signal terminal EM(n), a first terminal of the second switching transistor T2 is coupled to a second initialization signal terminal Vinit2, and a second terminal of the second switching transistor T2 is coupled to the fourth node N4.

During the implementation, when the signal at the enable signal terminal EM(n) is at a high level, the second switching transistor T2 is turned on, and a signal at the second initialization signal terminal Vinit2 is provided to the fourth node N4. Meanwhile, the signal at the second initialization signal terminal Vinit2 is provided to the second node N2 via the fourth node N4 and the turned-on first switching transistor T1.

Figure 5:
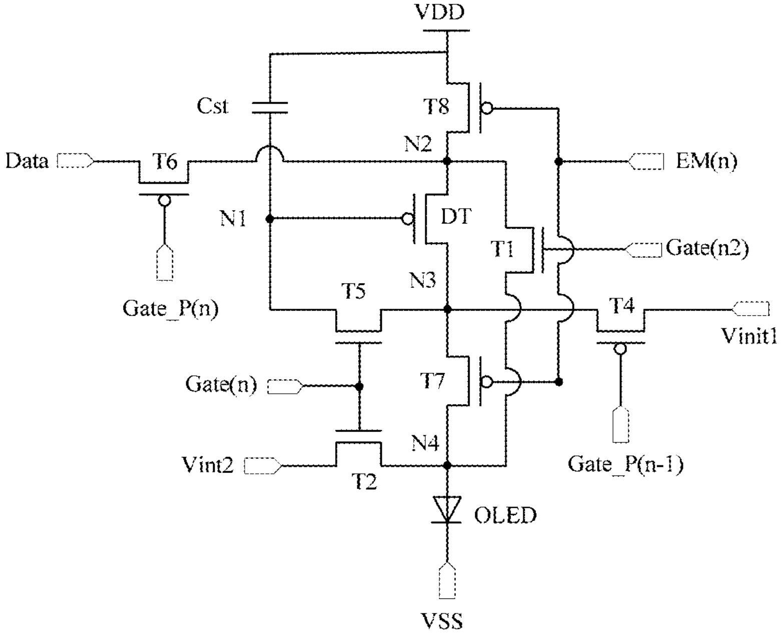
FIG. 5 is a circuit diagram of a second pixel driving circuit in embodiments of the present disclosure.

As shown in FIG. 5, in another embodiment, the first reset control sub-circuit includes: a first switching transistor T1 and a second switching transistor T2, where a polarity of the first switching transistor T1 is the same as a polarity of the second switching transistor T2.

It should be noted that in the embodiments of the present disclosure, the first switching transistor T1 and the second switching transistor T2 have the same polarity, and as shown in FIG. 5, the first switching transistor T1 is an N-type transistor, and the second switching transistor T2 is also an N-type transistor.

The first switching transistor T1 is connected to the other devices in FIG. 5 in the following relationship. A control terminal of the first switching transistor T1 is coupled to a fourth scanning signal terminal Gate(n2), a first terminal of the first switching transistor T1 is coupled to the fourth node N4, and a second terminal of the first switching transistor T1 is coupled to the second node N2.

During the implementation, when a signal at the fourth scanning signal terminal Gate(n2) is at a high level, the first switching transistor T1 is turned on, and a level of the fourth node N4 is equal to a level of the second node N2.

The second switching transistor T2 is connected to the other devices in FIG. 5 in the following relationship. A control terminal of the second switching transistor T2 is coupled to the third scanning signal terminal Gate(n), a first terminal of the second switching transistor T2 is coupled to a second initialization signal terminal Vinit2, and a second terminal of the second switching transistor T2 is coupled to the fourth node N4.

During the implementation, when a signal at the third scanning signal terminal Gate(n) is at a high level, the second switching transistor T2 is turned on, and the signal at the second initialization signal terminal Vinit2, after passing through the turned-on second switching transistor T2 and the turned-on first switching transistor T1, causes the fourth node N4 to be reset simultaneously with the second node N2.

Figure 6:
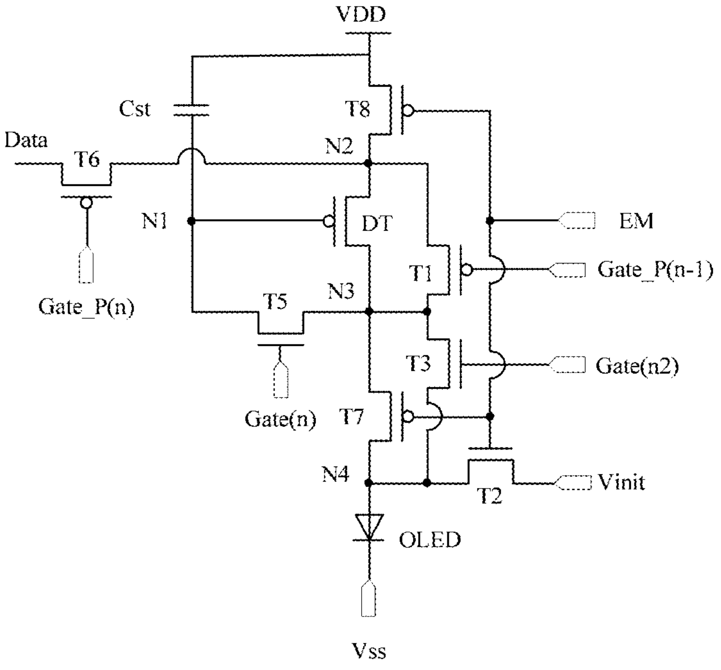
FIG. 6 is a circuit diagram of a third pixel driving circuit in embodiments of the present disclosure.

As shown in FIG. 6, in another embodiment, the first reset control sub-circuit includes: a first switching transistor T1, a second switching transistor T2, and a third switching transistor T3, where a polarity of the first switching transistor T1 is different from a polarity of the second switching transistor T2, and a polarity of the third switching transistor T3 is the same as the polarity of the second switching transistor T2.

It should be noted that, as shown in FIG. 6, in the embodiments of the present disclosure, the first switching transistor T1 and the second switching transistor T2 have different polarities, and the third switching transistor T3 and the second switching transistor T2 have the same polarity, i.e., the first switching transistor T1 is of a P-type polarity, and the third switching transistor T3 and the second switching transistor T2 are both of N-type polarities.

The first switching transistor T1 is connected to the other devices in FIG. 6 in the following relationship. A control terminal of the first switching transistor T1 is coupled to a second scanning signal terminal Gate_P(n−1), a first terminal of the first switching transistor T1 is coupled to the third switching transistor T3, and a second terminal of the first switching transistor T1 is coupled to the second node N2.

During the implementation, when a signal at the second scanning signal terminal Gate_P(n−1) is at a low level, the first switching transistor T1 is turned on and the second node N2 is made conduction with the third switching transistor T3.

The second switching transistor T2 is connected to the other devices in FIG. 6 in the following relationship. A control terminal of the second switching transistor T2 is coupled to an enable signal terminal EM(n), a first terminal of the second switching transistor T2 is coupled to the second initialization signal terminal Vinit, and a second terminal of the second switching transistor T2 is coupled to the fourth node N4.

During the implementation, the second switching transistor T2 is turned on when a signal at the enable signal terminal EM(n) is at a high level, and the signal at the second initialization signal terminal Vinit is provided to the fourth node N4.

The third switching transistor T3 is connected to the other devices in FIG. 6 in the following relationship. A control terminal of the third switching transistor T3 is coupled to a fourth scanning signal terminal Gate(n2), a first terminal of the third switching transistor T3 is coupled to the first terminal of the first switching transistor T1, and a second terminal of the third switching transistor T3 is coupled to the fourth node N4.

During the implementation, when a signal at the fourth scanning signal terminal Gate (n2) is at a high level, the third switching transistor T3 is turned on, and the fourth node N4 has the same level as the second node N2 via the turned-on third switching transistor T3 and the turned-on first switching transistor T1.

In order to ensure the display effect, in addition to resetting the levels of the second node N2 of the driving transistor DT, as shown with reference to FIGS. 3 and 4, the pixel driving circuit in the embodiments of the present disclosure further includes: a second reset control sub-circuit 40.

The second reset control sub-circuit is coupled to the first node N1 and the third node N3, and is configured to reset the levels of the first node N1 and the third node N3.

During the implementation, the above-described second reset control sub-circuit is provided such that the first node N1 and the third node N3 are reset simultaneously.

As shown in FIG. 4, in an embodiment, the second reset control sub-circuit includes: a fourth switching transistor T4 and a fifth switching transistor T5, where a polarity of the fourth switching transistor T4 is different from a polarity of the fifth switching transistor T5.

It should be noted that, as shown in FIG. 4, the polarity of the fourth switching transistor T4 is different from the polarity of the fifth switching transistor T5 in the embodiments of the present disclosure, and as can be seen from FIG. 4, the fourth switching transistor T4 is of a P-type polarity, and the fifth switching transistor T5 is of an N-type polarity.

The fourth switching transistor T4 is connected to the other devices in FIG. 4 in the following relationship. A control terminal of the fourth switching transistor T4 is coupled to the second scanning signal terminal Gate_P(n−1), the first terminal of the fourth switching transistor T4 is coupled to the first initialization signal terminal Vinit1, and the second terminal of the fourth switching transistor T4 is coupled to a first terminal of the fifth switching transistor T5.

During the implementation, when the signal at the second scanning signal terminal Gate_P(n−1) is at a low level, the fourth switching transistor T4 is turned on, and the signal at the first initialization signal terminal Vinit1 arrives at the third node N3 via the turned-on fourth switching transistor T4.

The fifth switching transistor T5 is connected to the other devices in FIG. 4 in the following relationship. A control terminal of the fifth switching transistor T5 is coupled to a third scanning signal terminal Gate(n), and the second terminal of the fifth switching transistor T5 is coupled to the first node N1.

During the implementation, when a signal at the third scanning signal terminal Gate(n) is at a high level, the fifth switching transistor T5 is turned on, and the signal at the first initialization signal terminal is provided to the first node N1 via the turned-on fourth switching transistor T4 and the turned-on fifth switching transistor T5.

Figure 7:
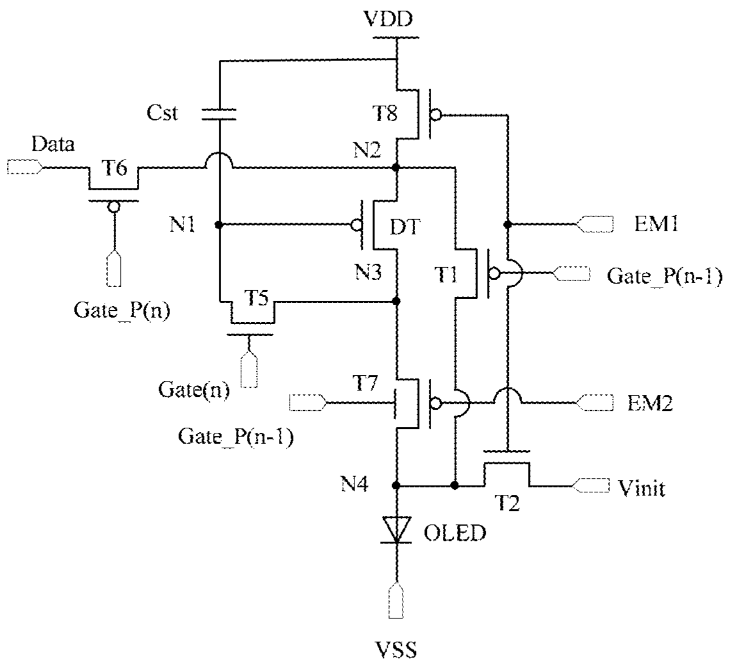
FIG. 7 is a circuit diagram of a fourth pixel driving circuit in embodiments of the present disclosure.

In another embodiment, referring to FIG. 6 or FIG. 7, the second reset control sub-circuit includes: a fifth switching transistor T5.

A control terminal of the fifth switching transistor T5 is coupled to a third scanning signal terminal Gate(n), a first terminal of the fifth switching transistor T5 is coupled to the third node N3, and a second terminal of the fifth switching transistor T5 is coupled to the first node N1.

During the implementation, after the fourth switching transistor T4 is removed, when the signal at the third scanning signal terminal Gate(n) is at a high level, the fifth switching transistor T5 is turned on, and the signal at the initialization signal terminal is provided to the first node N1 and the third node N3 via the turned-on fifth switching transistor T5.

After resetting each node associated with the driving transistor DT, the data voltage is written into the driving transistor DT by the data writing sub-circuit. As shown in FIG. 4, the data writing sub-circuit includes: a sixth switching transistor T6.

The sixth switching transistor T6 is connected to the other devices in FIG. 4 in the following relationship. A control terminal of the sixth switching transistor T6 is coupled to the first scanning signal terminal Gate_P(n), a first terminal of the sixth switching transistor T6 is coupled to the data signal terminal, and a second terminal of the sixth switching transistor T6 is coupled to the second node N2.

During the implementation, when the signal at the first scanning signal terminal Gate_P(n) is at a low level, the sixth switching transistor T6 is turned on, and the data voltage at the data signal terminal is provided to the gate of the driving transistor DT via the turned-on sixth switching transistor T6 and the turned-on driving transistor DT.

As shown in FIG. 4, the light-emitting control sub-circuit in the embodiments of the present disclosure includes: a seventh switching transistor T7.

The seventh switching transistor T7 is connected to the other devices in FIG. 4 is in the following relationship. A control terminal of the seventh switching transistor T7 is coupled to the enable signal terminal EM(n), a first terminal of the seventh switching transistor T7 is coupled to the fourth node N4, and a second terminal of the seventh switching transistor T7 is coupled to the third node N3.

During the implementation, when the enable signal terminal EM(n) is at a low level, the seventh switching transistor T7 is turned on, and the drive current is supplied to the light-emitting device OLED via the turned-on seventh switching transistor T7.

Furthermore, as shown in FIG. 4, in order to cause the light-emitting device OLED to emit light normally, the pixel driving circuit in the embodiments of the present disclosure further includes: an eighth switching transistor T8.

The eighth switching transistor T8 is connected to the other devices in FIG. 4 in the following relationship. A control terminal of the eighth switching transistor T8 is coupled to the enable signal terminal EM(n), a first terminal of the eighth switching transistor T8 is coupled to the second node N2, and a second terminal of the eighth switching transistor T8 is coupled to a first power supply terminal.

During the implementation, when the signal at the enable signal terminal EM(n) is at a low level, the eighth switching transistor T8 is turned on, and an electric signal at the first power supply terminal arrives at the driving transistor DT via the turned-on eighth switching transistor T8 to ensure the normal operation of the driving transistor DT.

In addition, in order to enable the gate of the driving transistor DT to effectively store the above-described data voltage, in the embodiments of the present disclosure, the pixel driving circuit also includes: a first capacitor Cst.

A first terminal of the first capacitor Cst is coupled to the first node N1, and a second terminal of the first capacitor Cst is coupled to the first power supply terminal.

During the implementation, after the data writing sub-circuit writes the data voltage into the gate of the driving transistor DT, the data voltage is stored through the first capacitor Cst to ensure that the data voltage is provided to the light-emitting device OLED during the light-emitting stage of the light-emitting device OLED.

As shown in FIG. 7, in another embodiment, the light-emitting control sub-circuit includes: a seventh switching transistor T7.

The seventh switching transistor T7 is connected to the other devices in FIG. 7 in the following relationship. The seventh switching transistor T7 is a double-gate transistor, a first gate of the seventh switching transistor T7 is coupled to the second scanning signal terminal Gate_P(n−1), and a second gate of the seventh switching transistor T7 is coupled to the enable signal terminal EM(n).

During the implementation, the seventh switching transistor T7 is turned on in time division under the control of the second scanning signal terminal Gate_P(n−1) and the enable signal terminal EM(n).

The following is the main operation process of the pixel driver circuit combined with the timing diagram.

At a stage of timing T1: a level of the enable signal terminal EM(n)=1, a level of the second scanning signal Gate_P(n−1)=0, a level of the first scanning signal Gate_P(n)=1, a level of and the third scanning signal Gate(n)=1.

Figure 8:
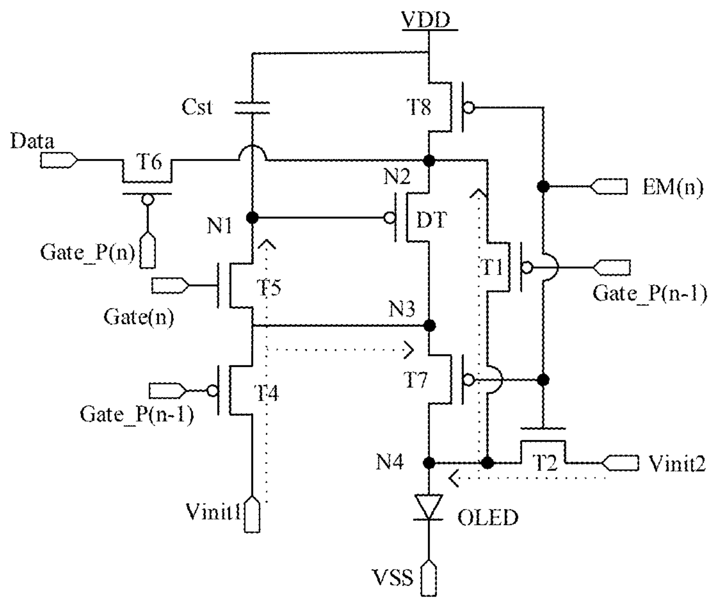
FIG. 8 is a first operation schematic diagram of the first pixel driving circuit in embodiments of the present disclosure.
Figure 9:
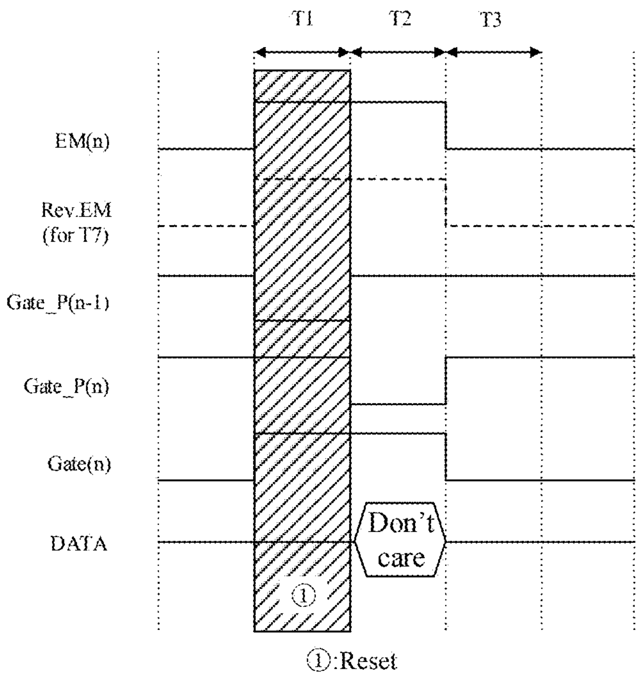
FIG. 9 is a schematic diagram of a first timing of the first pixel driving circuit in embodiments of the present disclosure.

As shown in FIGS. 8 and 9, when the enable signal terminal EM(n) is at the high level, the second switching transistor is turned on, the second initialization signal terminal Vinit2 causes the fourth node to be reset via the turned-on second switching transistor, and when the signal at the second scanning signal terminal Gate_P(n−1) is at the low level, the first switching transistor is turned on, the second initialization signal terminal Vinit2 causes the second node to be reset via the turned-on first switching transistor.

When the second scanning signal terminal Gate_P(n−1) is a low level, the fourth switching transistor is turned on, and the first initialization signal terminal Vinit1 resets the third node via the turned-on fourth switching transistor. When the third scanning signal terminal Gate(n) is at the high level, the fifth switching transistor is turned on, and the first initialization signal terminal Vinit1 resets the first node via the turned-on fifth switching transistor.

In summary, at the above stage of timing T1, the simultaneous reset of the four nodes of the first node, the second node, the third node, and the fourth node can be realized, which improves the reset efficiency while simplifying the circuit structure.

At a stage of timing T2: a level of the enable signal terminal EM(n)=1, a level of the second scanning signal terminal Gate_P(n−1)=1, a level of the first scanning signal terminal Gate_P(n)=0, and a level of the third scanning signal terminal Gate(n)=1.

Figure 10:
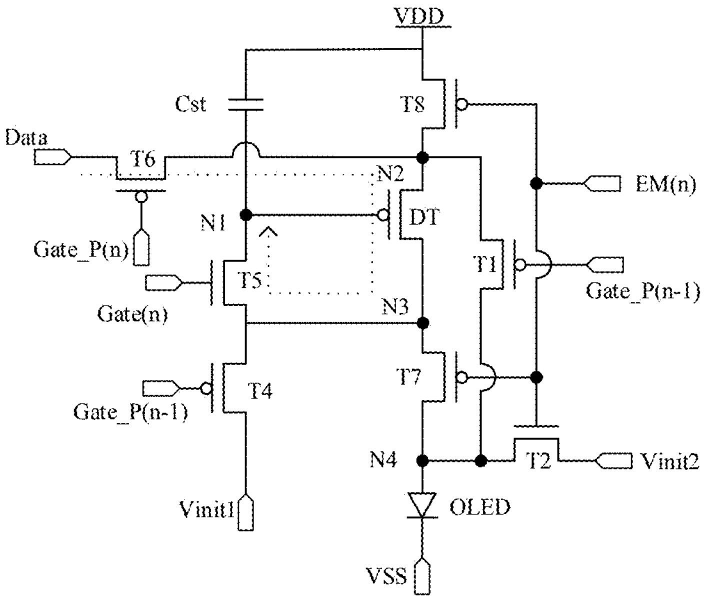
FIG. 10 is a second operation schematic diagram of the first pixel driving circuit in embodiments of the present disclosure.
Figure 11:
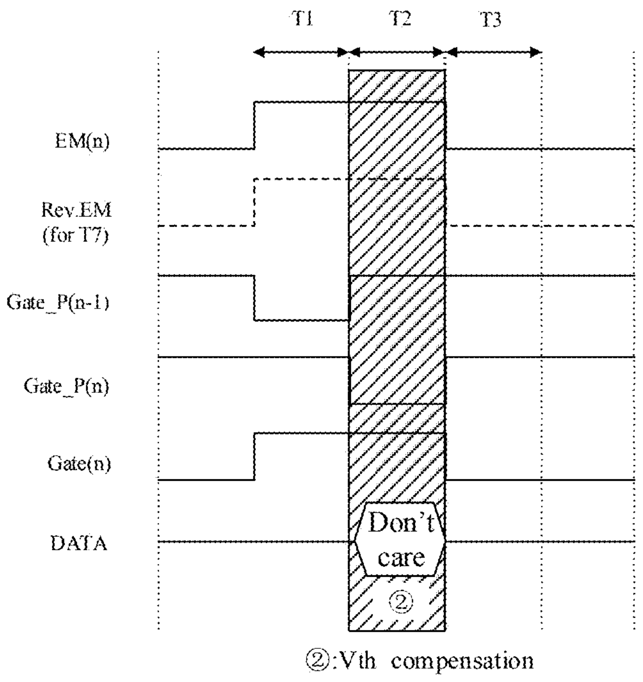
FIG. 11 is a schematic diagram of a second timing of the first pixel driving circuit in embodiments of the present disclosure.

As shown in FIGS. 10 and 11, the sixth switching transistor is turned on when the first scanning signal terminal Gate_P(n) is at the low level, and the data voltage at the data signal terminal arrives at the second node through the turned-on sixth switching transistor. Since the first node is reset at the above stage of timing T1, the driving transistor is turned on. The fifth switching transistor is turned on when the third scanning signal terminal Gate(n) is at the high level. The data voltage arrives at the first node, i.e., the gate of the driving transistor, through the turned-on driving transistor and the turned-on fifth switching transistor to.

At a stage of timing T3: a level of the enable signal terminal EM(n)=0, a level of the second scanning signal terminal Gate_P(n−1)=1, a level of the first scanning signal terminal Gate_P(n)=1, and a level of the third scanning signal terminal Gate(n)=0.

Figure 12:
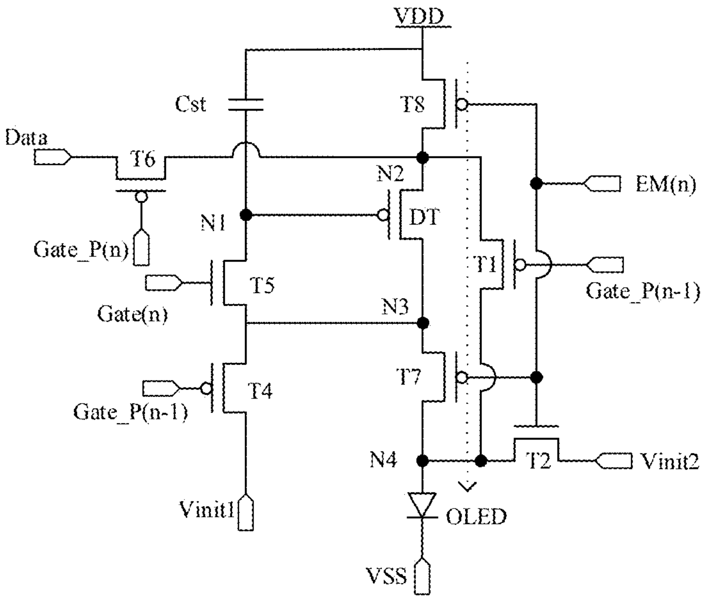
FIG. 12 is a third operation schematic diagram of the first pixel driving circuit in embodiments of the present disclosure.
Figure 13:
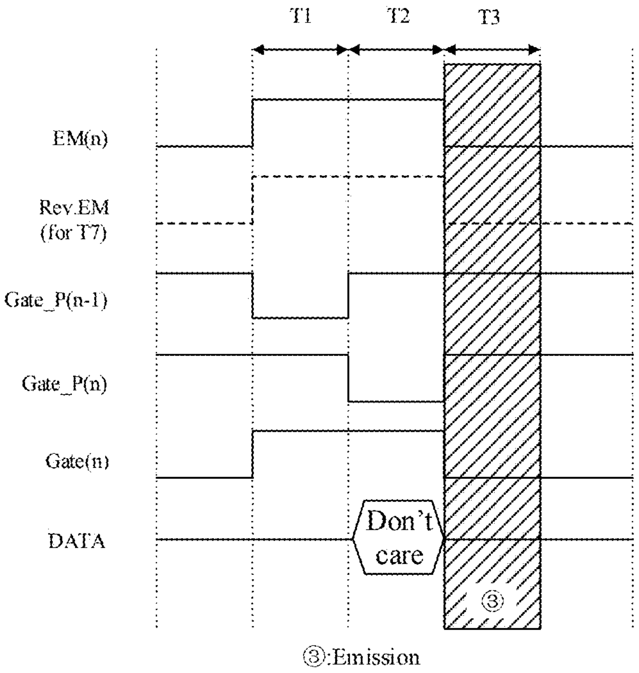
FIG. 13 is a schematic diagram of a third timing of the first pixel driving circuit in embodiments of the present disclosure.

As shown in FIGS. 12 and 13, when the enable signal terminal EM(n) is at the low level, the seventh switching transistor and the eighth switching transistor are turned on, and the signal at the first power supply terminal is provided to the driving transistor through the turned-on eighth transistor, so that the drive current at the gate of the driving transistor is provided to the light-emitting device OLED through the turned-on seventh transistor to cause the light-emitting device to emit light.

Figure 14:
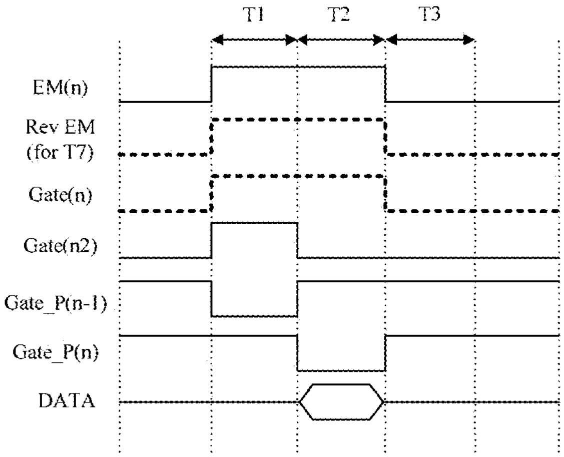
FIG. 14 is a schematic diagram of a timing of the second pixel driving circuit in embodiments of the present disclosure.

In addition, the embodiments of the present disclosure provide a timing, i.e., FIG. 14, corresponding to the circuit of FIG. 5. The following describes the operation process of the circuit shown in FIG. 5 in conjunction with FIG. 14.

At a stage of timing T1: a level of the enable signal terminal EM(n)=1, a level of the second scanning signal terminal Gate_P(n−1)=0, a level of the first scanning signal terminal Gate_P(n)=1, a level of the third scanning signal terminal Gate(n1)=1, a level of the fourth scanning signal terminal Gate(n2)=1.

As shown in FIGS. 5 and 14, when the signal at the second scanning signal terminal Gate_P(n−1) is at the low level, the fourth switching transistor is turned on, and the first initialization signal terminal Vinit1 resets the third node via the turned-on fourth switching transistor.

When the third scanning signal terminal Gate(n1) is at the high level, the second switching transistor and the fifth switching transistor are turned on, and the second initialization signal terminal Vinit2 resets the fourth node via the turned-on fourth switching transistor. When the fourth scanning signal terminal Gate(n2) is at the high level, the first switching transistor is turned on, and the first initialization signal terminal Vinit1 resets the second node via the fourth node and the turned-on first switching transistor.

The first initialization signal terminal Vinit1 resets the first node via the third node and the turned-on fifth switching transistor.

In summary, at the above stage of timing T1, the simultaneous reset of the four nodes of the first node, the second node, the third node, and the fourth node can be realized, which improves the reset efficiency while simplifying the circuit structure.

At a stage of timing T2: a level of the enable signal terminal EM(n)=1, a level of the second scanning signal terminal Gate_P(n−1)=1, a level of the first scanning signal terminal Gate_P(n)=0, a level of the third scanning signal terminal Gate(n1)=1, and a level of the fourth scanning signal terminal Gate(n2)=0.

As shown in FIGS. 5 and 14, the sixth switching transistor is turned on when the first scanning signal terminal Gate_P(n) is at the low level, and the data voltage at the data signal terminal arrives at the second node through the turned-on sixth switching transistor. Since the first node is reset at the above stage of timing T1, the driving transistor is turned on.

The fifth switching transistor is turned on when the third scanning signal terminal Gate(n) is at the high level. The data voltage arrives at the first node, i.e., the gate of the driving transistor, through the turned-on driving transistor and the turned-on fifth switching transistor.

At a stage of timing T3: a level of the enable signal terminal EM(n)=0, a level of the second scanning signal terminal Gate_P(n−1)=1, a level of the first scanning signal terminal Gate_P(n)=1, a level of the third scanning signal terminal Gate(n1)=0, and a level of the fourth scanning signal terminal Gate(n2)=0.

As shown in FIGS. 5 and 14, when the enable signal terminal EM(n) is at the low level, the seventh switching transistor and the eighth switching transistor are turned on, and the signal at the first power supply terminal is provided to the driving transistor through the turned-on eighth transistor, so that the drive current at the gate of the driving transistor is provided to the light-emitting device OLED through the turned-on seventh transistor to cause the light-emitting device to emit light.

Figure 15:
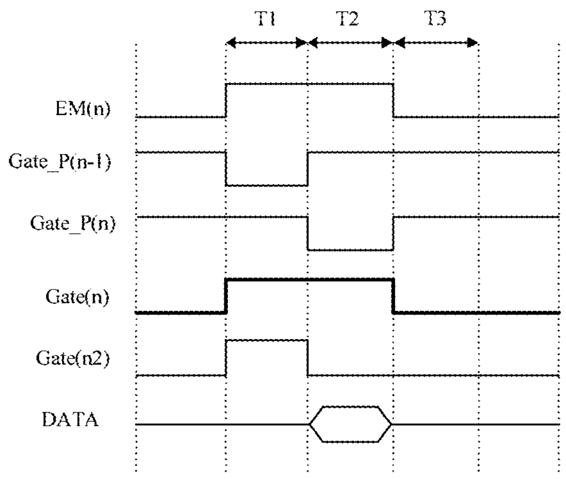
FIG. 15 is a schematic diagram of a timing of a third pixel driving circuit in embodiments of the present disclosure.

In addition, the embodiments of the present disclosure provide a timing, i.e., FIG. 15, corresponding to the circuit of FIG. 6. The following describes the operation process of the circuit shown in FIG. 6 in conjunction with FIG. 15.

At a stage of timing T1: a level of the enable signal terminal EM(n)=1, a level of the second scanning signal terminal Gate_P(n−1)=0, a level of the first scanning signal terminal Gate_P(n)=1, a level of the third scanning signal terminal Gate(n)=1, a level of the third scanning signal terminal Gate(n1)=1, and a level of the fourth scanning signal terminal Gate(n2)=1.

As shown in FIGS. 6 and 15, the second switching transistor is turned on when the enable signal terminal EM(n) is at the high level, the second initialization signal terminal Vinit resets the fourth node via the turned-on second switching transistor, the first switching transistor is turned on when the signal at the second scanning signal terminal Gate_P(n−1) is at the low level, the third switching transistor is turned on when the fourth scanning signal terminal Gate(n2) is at the high level, and the second initialization signal terminal Vinit resets the second node via the turned-on third switching transistor and the turned-on first switching transistor.

When the third scanning signal terminal Gate(n) is at the high level, the fifth switching transistor is turned on, and the first initialization signal terminal Vinit resets the third node via the turned-on third switching transistor. The first initialization signal terminal Vinit resets the first node via the turned-on third switching transistor and the turned-on fifth switching transistor.

In summary, the first initialization signal terminal and the second initialization signal terminal may be the same one signal terminal, and in the embodiments of the present disclosure, different nodes are reset by utilizing the same one initialization signal.

At the above stage of timing T1, the simultaneous reset of the four nodes of the first node, the second node, the third node, and the fourth node can be realized by utilizing one initialization signal terminal, which improves the reset efficiency while simplifying the circuit structure.

At a stage of timing T2: a level of the enable signal terminal EM(n)=1, a level of the second scanning signal terminal Gate_P(n−1)=1, a level of the first scanning signal terminal Gate_P(n)=0, a level of the third scanning signal terminal Gate(n1)=1, and a level of the fourth scanning signal terminal Gate(n2)=0.

As shown in FIGS. 6 and 15, the sixth switching transistor is turned on when the first scanning signal terminal Gate_P (n) is at the low level, and the data voltage at the data signal terminal arrives at the second node through the turned-on sixth switching transistor. Since the first node is reset at the above stage of timing T1, the driving transistor is turned on. The fifth switching transistor is turned on when the third scanning signal terminal Gate(n) is at the high level. The data voltage arrives at the first node, i.e., the gate of the driving transistor, through the turned-on driving transistor and the turned-on fifth switching transistor.

At a stage of timing T3: the enable signal terminal EM(n)=0, the second scanning signal terminal Gate_P(n−1)=1, the first scanning signal terminal Gate_P(n)=1, the third scanning signal terminal Gate(n1)=0, and the fourth scanning signal terminal Gate(n2)=0.

As shown in FIGS. 6 and 15, when the enable signal terminal EM(n) is at the low level, the seventh switching transistor and the eighth switching transistor are turned on, and the signal at the first power supply terminal is provided to the driving transistor through the turned-on eighth transistor, so that the drive current at the gate of the driving transistor is provided to the light-emitting device OLED through the turned-on seventh transistor to cause the light-emitting device to emit light.

Figure 16:
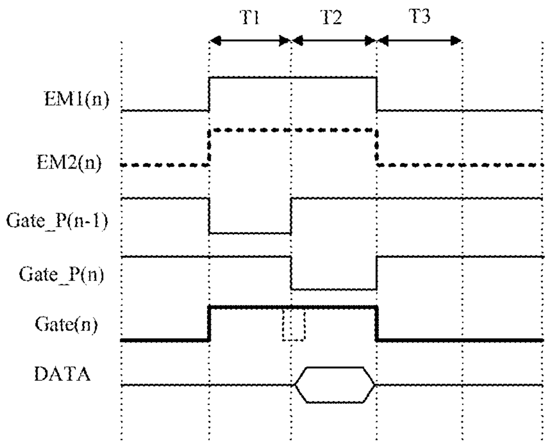
FIG. 16 is a schematic diagram of a timing of a fourth pixel driving circuit in embodiments of the present disclosure.

In addition, the embodiments of the present disclosure provide a timing i.e., FIG. 16, corresponding to the circuit of FIG. 7. The following describes the operation process of the circuit shown in FIG. 7 in conjunction with FIG. 16.

At a stage of timing T1: levels of the enable signal terminals EM1(*n*)=EM2(*n*)=1, a level of the second scanning signal terminal Gate_P(n−1)=0, a level of the first scanning signal terminal Gate_P(n)=1, and a level of the third scanning signal terminal Gate(n)=1.

As shown in FIGS. 7 and 16, when the enable signal terminal EM1(*n*) is at the high level, the second switching transistor is turned on, the second initialization signal terminal Vinit causes the fourth node to be reset via the turned-on second switching transistor. When the signal at the second scanning signal terminal Gate_P(n−1) is at the low level, the first switching transistor is turned on, the second initialization signal terminal Vinit causes the second node to be reset via the turned-on first switching transistor.

When the second scanning signal terminal Gate_P(n−1) is at the low level, the seventh switching transistor is turned on, and the first initialization signal terminal Vinit resets the third node via the turned-on second switching transistor and the turned-on seventh switching transistor. When the third scanning signal terminal Gate(n) is at the high level, the fifth switching transistor is turned on, and the first initialization signal terminal Vinit resets the first node by the third node and the turned-on fifth switching transistor.

In summary, the first initialization signal terminal and the second initialization signal terminal may be the same one signal terminal, and in the embodiments of the present disclosure, different nodes are reset by utilizing the same one initialization signal.

At the above stage of timing T1, the simultaneous reset of the four nodes of the first node, the second node, the third node, and the fourth node can be realized by utilizing one initialization signal terminal, which improves the reset efficiency while simplifying the circuit structure.

At a stage of timing T2: levels of the enable signal terminals EM1(*n*)=EM2(*n*)=1, a level of the second scanning signal terminal Gate_P(n−1)=1, a level of the first scanning signal terminal Gate_P(n)=0, and a level of the third scanning signal terminal Gate(n)=1.

As shown in FIGS. 7 and 16, the sixth switching transistor is turned on when the first scanning signal terminal Gate_P (n) is at the low level, and the data voltage at the data signal terminal arrives at the second node through the turned-on sixth switching transistor. Since the first node is reset at the above stage of timing T1, the driving transistor is turned on. The fifth switching transistor is turned on when the third scanning signal terminal Gate(n) is at the high level. The data voltage arrives at the first node, i.e., the gate of the driving transistor, through the turned-on driving transistor and the turned-on fifth switching transistor.

At a stage of timing T3: levels of the enable signal terminals EM1(*n*)=EM2(*n*)=0, a level of the second scanning signal terminal Gate_P(n−1)=1, a level of the first scanning signal terminal Gate_P(n)=1, and a level of the third scanning signal terminal Gate(n)=0.

As shown in FIGS. 7 and 16, the eighth switching transistor is turned on when the enable signal terminal EM1(*n*) is at the low level, and the seventh switching transistor is turned on when the enable signal terminal EM2(*n*) is at the low level, and the signal at the first power supply terminal is provided to the driving transistor through the turned-on eighth transistor, so that the drive current at the gate of the driving transistor is provided to the light-emitting device OLED through the turned-on seventh transistor to cause the light-emitting device to emit light.

Based on the same inventive concept, a display device is provided in the embodiments of the present disclosure, including the above-described pixel driving circuit.

In the embodiments of the present disclosure, the display device may be: a cellular phone, a tablet computer, a television set, a monitor, a laptop computer, a digital photo frame, a navigator, and any other product or component having a display function. The other essential components of the display device are understood by those of ordinary skill in the art, and are not described herein, nor should they be used as a limitation of the present disclosure.

Based on the same inventive concept, embodiments of the present disclosure provide a driving method of a pixel driving circuit, including the following.

The first reset control sub-circuit resets the level of the second node coupled to the driving transistor.

During the implementation, the level of the second node coupled to the driving transistor is firstly reset by the first switching transistor and the second switching transistor in the first reset control sub-circuit.

The data writing sub-circuit inputs the data voltage at the data signal terminal into the first node coupled to the driving transistor in response to the signal at the first scanning signal terminal.

After resetting the second node, the data writing sub-circuit inputs the data voltage at the data signal terminal to the first node coupled to the driving transistor in response to an effective signal at the first scanning signal terminal.

The driving transistor generates the drive current in response to the data voltage.

During the implementation, after the data voltage is written into the gate of the driving transistor, the driving transistor generates the drive current for supplying to the light-emitting device based on the data voltage.

The light-emitting control sub-circuit provides the drive current generated by the driving transistor to the light-emitting device.

During the implementation, after generating the drive current, the drive current generated by the driving transistor is provided to the light-emitting device via the light-emitting control sub-circuit to cause the light-emitting device to emit light.

In summary, in the embodiments of the present disclosure, the pixel driving circuit, the display device, and the driving method are provided. The pixel driving circuit includes: the driving transistor, the light-emitting device, the first reset control sub-circuit, the data writing sub-circuit, and the light-emitting control sub-circuit. The gate of the driving transistor is coupled to the first node, the first electrode of the driving transistor is coupled to the second node, and the second electrode of the driving transistor is coupled to the third node, and the driving transistor is configured to, based on the data voltage, generate the drive current; the first reset control sub-circuit is coupled to the second node and the fourth node, and is configured to reset the level of the second node and the level of the fourth node; the data writing sub-circuit is coupled to the second node, and is configured to, in response to the signal at the first scanning signal terminal, input the data voltage at the data signal terminal into the first node; and the light-emitting control sub-circuit is coupled to the light-emitting device through the driving transistor, and the light-emitting control sub-circuit is configured to provide the drive current generated by the driving transistor to the light-emitting device. The reset of the second node can be realized without additionally setting up a reset port in the above-described solution, thereby simplifying the reset process of the driving transistor.

It should be appreciated by those skilled in the art that the embodiments of the present disclosure may be provided as methods, systems, or computer program product systems. Thus, the present disclosure may take the form of a fully hardware embodiment, a fully software embodiment, or an embodiment that combines software and hardware aspects. Further, the present disclosure may take the form of a computer program product system implemented on one or more computer-usable storage media (including, but not limited to, disk memory, CD-ROM, optical memory, and the like) that contain computer-usable program codes therein.

The present disclosure is described with reference to flowcharts and/or block diagrams of methods, devices (systems), and computer program product systems according to the present disclosure. It should be understood that each of the processes and/or blocks in the flowchart and/or block diagram, and the combination of processes and/or blocks in the flowchart and/or block diagram, may be implemented by computer program instructions. These computer program instructions may be provided to a processor of a general-purpose computer, a special-purpose computer, an embedded processor, or other programmable data-processing device to produce a machine such that the instructions executed by the processor of the computer or other programmable data-processing device produce an apparatus for carrying out the function specified in the one or more processes of the flowchart and/or one or more blocks of the block diagram.

These computer program instructions may also be stored in computer-readable memory capable of directing the computer or other programmable data processing device to operate in a particular manner such that the instructions stored in the computer-readable memory produce an article of manufacture including an instruction apparatus that implements the function specified in the one or more processes of the flowchart and/or one or more blocks of the block diagram.

These computer program instructions may also be loaded onto a computer or other programmable data processing device such that a series of operational steps are performed on the computer or other programmable device to produce computer-implemented processing, such that the instructions executed on the computer or other programmable device provide steps for implementing the function specified in the one or more processes of the flowchart and/or one or more blocks of the block diagram.

Obviously, those skilled in the art can make various changes and variations to the present disclosure without departing from the spirit and scope of the present disclosure. Thus, to the extent that such modifications and variations of the present disclosure are within the scope of the present claims and their technical equivalents, the present disclosure is intended to encompass such modifications and variations.

What is claimed is:

1. A pixel driving circuit, comprising: a driving transistor, a light-emitting device, a first reset control sub-circuit, a data writing sub-circuit, and a light-emitting control sub-circuit; wherein a gate of the driving transistor is coupled to a first node, a first electrode of the driving transistor is coupled to a second node, and a second electrode of the driving transistor is coupled to a third node, and the driving transistor is configured to, based on a data voltage, generate a drive current;

the first reset control sub-circuit is coupled to the second node and a fourth node, and is configured to reset a level of the second node and a level of the fourth node;

the data writing sub-circuit is coupled to the second node, and is configured to, in response to a signal at a first scanning signal terminal, input the data voltage at a data signal terminal into the first node; and the light-emitting control sub-circuit is coupled to the light-emitting device through the driving transistor, and the light-emitting control sub-circuit is configured to provide the drive current generated by the driving transistor to the light-emitting device;

wherein the first reset control sub-circuit comprises: a first switching transistor and a second switching transistor, wherein a polarity of the first switching transistor is different from a polarity of the second switching transistor; wherein a control terminal of the first switching transistor is coupled to a second scanning signal terminal, a first terminal of the first switching transistor is coupled to the fourth node, and a second terminal of the first switching transistor is coupled to the second node; and a control terminal of the second switching transistor is coupled to an enable signal terminal, a first terminal of the second switching transistor is coupled to a second initialization signal terminal, and a second terminal of the second switching transistor is coupled to the fourth node.

2. The pixel driving circuit according to claim 1, further comprising: a second reset control sub-circuit; wherein the second reset control sub-circuit is coupled to the first node and the third node, and is configured to reset the first node and the third node.

3. The pixel driving circuit according to claim 2, wherein the second reset control sub-circuit comprises: a fourth switching transistor and a fifth switching transistor, wherein a polarity of the fourth switching transistor is different from a polarity of the fifth switching transistor; wherein a control terminal of the fourth switching transistor is coupled to a second scanning signal terminal, a first terminal of the fourth switching transistor is coupled to a first initialization signal terminal, and a second terminal of the fourth switching transistor is coupled to a first terminal of the fifth switching transistor; and a control terminal of the fifth switching transistor is coupled to a third scanning signal terminal, and a second terminal of the fifth switching transistor is coupled to the first node.

4. The pixel driving circuit according to claim 2, wherein the second reset control sub-circuit comprises: a fifth switching transistor; wherein a control terminal of the fifth switching transistor is coupled to a third scanning signal terminal, a first terminal of the fifth switching transistor is coupled to the third node, and a second terminal of the fifth switching transistor is coupled to the first node.

5. The pixel driving circuit according to claim 1, wherein the data writing sub-circuit comprises: a sixth switching transistor; wherein a control terminal of the sixth switching transistor is coupled to the first scanning signal terminal, a first terminal of the sixth switching transistor is coupled to the data signal terminal, and a second terminal of the sixth switching transistor is coupled to the second node.

6. The pixel driving circuit according to claim 1, wherein the light-emitting control sub-circuit comprises: a seventh switching transistor; wherein a control terminal of the seventh switching transistor is coupled to an enable signal terminal, a first terminal of the seventh switching transistor is coupled to the fourth node, and a second terminal of the seventh switching transistor is coupled to the third node.

7. The pixel driving circuit according to claim 1, further comprising: an eighth switching transistor; wherein a control terminal of the eighth switching transistor is coupled to an enable signal terminal, a first terminal of the eighth switching transistor is coupled to the second node, and a second terminal of the eighth switching transistor is coupled to a first power supply terminal.

8. The pixel driving circuit according to claim 1, further comprising: a first capacitor; wherein a first terminal of the first capacitor is coupled to the first node, and a second terminal of the first capacitor is coupled to a first power supply terminal.

9. The pixel driving circuit according to claim 1, wherein the light-emitting control sub-circuit comprises: a seventh switching transistor; wherein the seventh switching transistor is a double-gate transistor, a first gate of the seventh switching transistor is coupled to a second scanning signal terminal, and a second gate of the seventh switching transistor is coupled to an enable signal terminal.

10. A display device, comprising: the pixel driving circuit according to claim 1.

11. A driving method of the pixel driving circuit according to claim 1, comprising:

resetting, by the first reset control sub-circuit, the level of the second node coupled to the driving transistor;

inputting, by the data writing sub-circuit, the data voltage at the data signal terminal into the first node coupled to the driving transistor in response to the signal at the first scanning signal terminal;

generating, by the driving transistor, the drive current based on the data voltage; and providing, by the light-emitting control sub-circuit, the drive current generated by the driving transistor to the light-emitting device.

12. A pixel driving circuit, comprising: a driving transistor, a light-emitting device, a first reset control sub-circuit, a data writing sub-circuit, and a light-emitting control sub-circuit; wherein a gate of the driving transistor is coupled to a first node, a first electrode of the driving transistor is coupled to a second node, and a second electrode of the driving transistor is coupled to a third node, and the driving transistor is configured to, based on a data voltage, generate a drive current;

the first reset control sub-circuit is coupled to the second node and a fourth node, and is configured to reset a level of the second node and a level of the fourth node;

the data writing sub-circuit is coupled to the second node, and is configured to, in response to a signal at a first scanning signal terminal, input the data voltage at a data signal terminal into the first node; and the light-emitting control sub-circuit is coupled to the light-emitting device through the driving transistor, and the light-emitting control sub-circuit is configured to provide the drive current generated by the driving transistor to the light-emitting device;

wherein the first reset control sub-circuit comprises: a first switching transistor and a second switching transistor, wherein a polarity of the first switching transistor is the same as a polarity of the second switching transistor; wherein a control terminal of the first switching transistor is coupled to a fourth scanning signal terminal, a first terminal of the first switching transistor is coupled to the fourth node, and a second terminal of the first switching transistor is coupled to the second node; and a control terminal of the second switching transistor is coupled to a third scanning signal terminal, a first terminal of the second switching transistor is coupled to a second initialization signal terminal, and a second terminal of the second switching transistor is coupled to the fourth node.

13. The pixel driving circuit according to claim 12, further comprising: a second reset control sub-circuit; wherein the second reset control sub-circuit is coupled to the first node and the third node, and is configured to reset the first node and the third node.

14. The pixel driving circuit according to claim 13, wherein the second reset control sub-circuit comprises: a fourth switching transistor and a fifth switching transistor, wherein a polarity of the fourth switching transistor is different from a polarity of the fifth switching transistor; wherein a control terminal of the fourth switching transistor is coupled to a second scanning signal terminal, a first terminal of the fourth switching transistor is coupled to a first initialization signal terminal, and a second terminal of the fourth switching transistor is coupled to a first terminal of the fifth switching transistor; and a control terminal of the fifth switching transistor is coupled to a third scanning signal terminal, and a second terminal of the fifth switching transistor is coupled to the first node.

15. The pixel driving circuit according to claim 13, wherein the second reset control sub-circuit comprises: a fifth switching transistor; wherein a control terminal of the fifth switching transistor is coupled to a third scanning signal terminal, a first terminal of the fifth switching transistor is coupled to the third node, and a second terminal of the fifth switching transistor is coupled to the first node.

16. The pixel driving circuit according to claim 12, wherein the light-emitting control sub-circuit comprises: a seventh switching transistor; wherein the seventh switching transistor is a double-gate transistor, a first gate of the seventh switching transistor is coupled to a second scanning signal terminal, and a second gate of the seventh switching transistor is coupled to an enable signal terminal.

17. A pixel driving circuit, comprising: a driving transistor, a light-emitting device, a first reset control sub-circuit, a data writing sub-circuit, and a light-emitting control sub-circuit; wherein a gate of the driving transistor is coupled to a first node, a first electrode of the driving transistor is coupled to a second node, and a second electrode of the driving transistor is coupled to a third node, and the driving transistor is configured to, based on a data voltage, generate a drive current;

the first reset control sub-circuit is coupled to the second node and a fourth node, and is configured to reset a level of the second node and a level of the fourth node;

the data writing sub-circuit is coupled to the second node, and is configured to, in response to a signal at a first scanning signal terminal, input the data voltage at a data signal terminal into the first node; and the light-emitting control sub-circuit is coupled to the light-emitting device through the driving transistor, and the light-emitting control sub-circuit is configured to provide the drive current generated by the driving transistor to the light-emitting device;

wherein the first reset control sub-circuit comprises: a first switching transistor, a second switching transistor, and a third switching transistor, wherein a polarity of the first switching transistor is different from a polarity of the second switching transistor, and a polarity of the third switching transistor is the same as the polarity of the second switching transistor; wherein a control terminal of the first switching transistor is coupled to a second scanning signal terminal, a first terminal of the first switching transistor is coupled to the third switching transistor, and a second terminal of the first switching transistor is coupled to the second node;

a control terminal of the second switching transistor is coupled to an enable signal terminal, a first terminal of the second switching transistor is coupled to a second initialization signal terminal, and a second terminal of the second switching transistor is coupled to the fourth node; and a control terminal of the third switching transistor is coupled to a fourth scanning signal terminal, a first terminal of the third switching transistor is coupled to the first terminal of the first switching transistor, and a second terminal of the third switching transistor is coupled to the fourth node.

18. The pixel driving circuit according to claim 17, further comprising: a second reset control sub-circuit; wherein the second reset control sub-circuit is coupled to the first node and the third node, and is configured to reset the first node and the third node;

wherein the second reset control sub-circuit comprises: a fourth switching transistor and a fifth switching transistor, wherein a polarity of the fourth switching transistor is different from a polarity of the fifth switching transistor; wherein a control terminal of the fourth switching transistor is coupled to a second scanning signal terminal, a first terminal of the fourth switching transistor is coupled to a first initialization signal terminal, and a second terminal of the fourth switching transistor is coupled to a first terminal of the fifth switching transistor; and a control terminal of the fifth switching transistor is coupled to a third scanning signal terminal, and a second terminal of the fifth switching transistor is coupled to the first node.

19. The pixel driving circuit according to claim 17, further comprising: a second reset control sub-circuit; wherein the second reset control sub-circuit is coupled to the first node and the third node, and is configured to reset the first node and the third node;

wherein the second reset control sub-circuit comprises: a fifth switching transistor; wherein a control terminal of the fifth switching transistor is coupled to a third scanning signal terminal, a first terminal of the fifth switching transistor is coupled to the third node, and a second terminal of the fifth switching transistor is coupled to the first node.

20. The pixel driving circuit according to claim 17, wherein the light-emitting control sub-circuit comprises: a seventh switching transistor; wherein the seventh switching transistor is a double-gate transistor, a first gate of the seventh switching transistor is coupled to a second scanning signal terminal, and a second gate of the seventh switching transistor is coupled to an enable signal terminal.

* * * * *